Patented Mar. 13, 1934

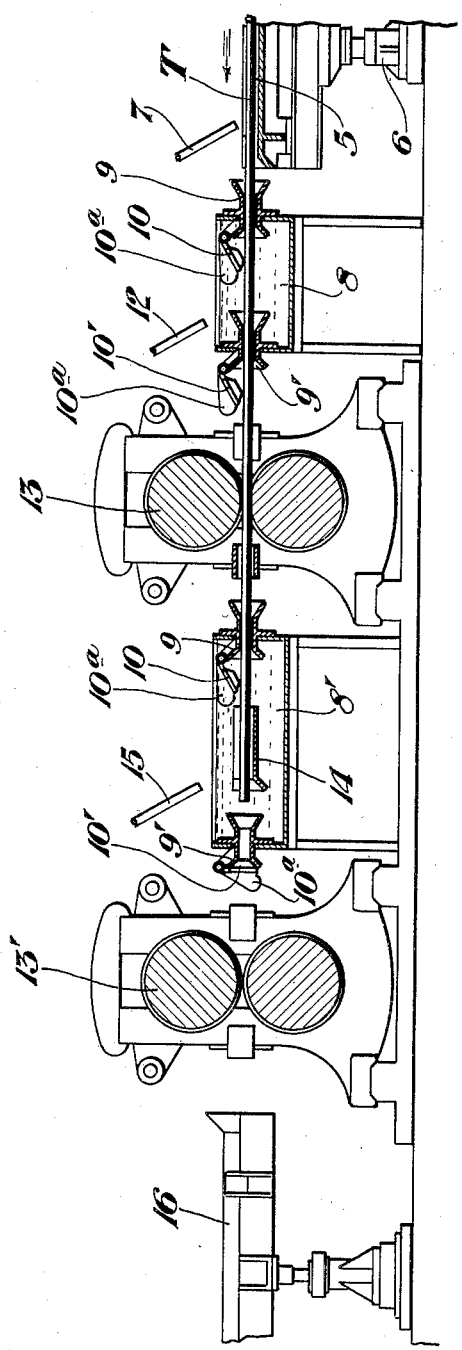

1,951,066

UNITED STATES PATENT OFFICE 1,951,066

REMOVING SCALE FROM PIPES AND TUBES

Herman J. Shelly, Gary, Ind., assignor to National Tube Company, a corporation of New Jersey Application November 22, 1930, Serial No. 497,529

1 Claim. (Cl. 29—81)

This invention relates to a method of and apparatus for removing scale from rolled tubular metal products due to oxidation of the metal during and subsequent to formation of the tube or pipe, and has for its principal object the provision of an effective scale-removing means which will operate automatically and as fast as the tubes or pipes are produced and delivered thereto, with a consequent increase in output and a reduction in cost of the finished product.

The method, generally stated, consists in immersing the tube when heated to a proper temperature in a cooling medium to generate steam pressure within the pipe and blow the scale therefrom.

The apparatus used in carrying out the method consists, generally, in one or a plurality of boshes or receptacles positioned between breakdown rolls, a cooling medium such as water being supplied to the boshes and the latter being provided with automatically operating valves which prevent the escape of water therefrom and maintain the level of the water above the level of the tube while the latter is passing therethrough, the water contacting with the heated metal pipe generating steam therein and blowing the scale therefrom, the breakdown rolls assisting in loosening the scale from the surface of the metal.

The practice of submerging metal sheets in a cooling medium to prevent oxidation is old in the art, but as far as known, the process of generating steam within rolled tubular products to remove the scale from the interior thereof has not heretofore been proposed.

The drawing illustrates in sectional side elevation a preferred type of apparatus used in carrying out the method.

The present method and apparatus is adapted for use in removing scale from tubular metal products such as cold drawn seamless tubing, lap-welded and butt-welded pipe and the like, and may be mounted in line to receive the tubing as it is being formed.

The tube or pipe, indicated at T, is first propelled or passed through a trough 5 which is adjustably supported on a base or pedestal 6 and supplied with a cooling medium such as water through a pipe 7, the water in this preliminary cooling operation being applied on the exterior surface of the tube. This cooling operation causes scale formation on the inside and outside of the tube, as will be understood by those skilled in the art, and the present invention is concerned with the removal of this scale.

After leaving the trough 5 the tube enters a receptacle or bosh 8 through a nozzle 9 which is provided with a valve 10, the nozzle snugly engaging around the pipe and preventing escape of water from the bosh, the water or analogous cooling agent being supplied to said bosh through a pipe 12.

The tube passes through the bosh wholly immersed and passes out through a nozzle 9' which is provided with a valve 10' substantially similar to the nozzle 9 and valve 10 at the entrance of the bosh. The tube then passes through the first stand of breakdown rolls generally indicated at 13, which exert pressure on the tube and assist in loosening the scale therefrom. The valves 10 and 10' close immediately after the end of the tube passes through the nozzles 9 and 9' and prevent escape of water from the bosh and said valves also serve to maintain the level of the water in the bosh above the level of the pipe or tube, the latter being completely submerged in the cooling medium.

After leaving the first stand of breakdown rolls 13, the tube enters another receptacle or bosh 8' in which a guide 14 is mounted, said receptacle being supplied with a cooling agent such as water through a pipe 15, the guide being wholly immersed in the water. This bosh or receptacle is also provided with nozzles 9 and 9' and valves 10 and 10', and the tube passes through the guide and said bosh wholly immersed as in the first instance.

The tube leaving the bosh 8' passes through a second stand of breakdown rolls 13' and thence to outgoing trough 16.

The valves 10 and 10' are provided with a weight 10ª which insures prompt closing and a snug fit of the valve in its seat.

The operation of the apparatus will be readily apparent. When the tube is cooled, oxidation takes place and scale forms on the interior and exterior surfaces of the tube. As the tube enters the bosh 8 and the water or analogous cooling agent comes in contact with the hot metal, steam pressure is generated interiorly as well as exteriorly of the tube, the pressure being sufficient to blow the scale from the inside of the pipe and release the scale from the exterior thereof.

The breakdown rolls assist in liberating or loosening the scale from the surface of the metal so that it may be more readily removed therefrom by the steam and washing action of the water.

The guide 14 maintains the tube in accurate alinement with the exit nozzles, and while only one of said guides is shown it will be understood that each bosh or receptacle may be provided with a guide if found desirable or necessary.

What is claimed as new is:

Apparatus for removing scale from rolled tubular products, comprising one or a plurality of stands of breakdown rolls, one or a plurality of water receptacles alternately disposed with relation to said rolls, said receptacles being provided with entrance and exit nozzles through which the tubes pass and valves adapted to close said nozzles after the tubes have passed therethrough and prevent escape of water from said receptacles.

HERMAN J. SHELLY.